US011945685B2

(12) United States Patent
Wei

(10) Patent No.: US 11,945,685 B2
(45) Date of Patent: Apr. 2, 2024

(54) MAGNETICALLY ACTIVATED ELEVATOR DOOR LOCK

(71) Applicant: OTIS ELEVATOR COMPANY, Farmington, CT (US)

(72) Inventor: Wei Wei, Unionville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 467 days.

(21) Appl. No.: 17/007,101

(22) Filed: Aug. 31, 2020

(65) Prior Publication Data

US 2022/0063962 A1 Mar. 3, 2022

(51) Int. Cl.
*B66B 13/14* (2006.01)
*B66B 13/06* (2006.01)

(52) U.S. Cl.
CPC .............. *B66B 13/14* (2013.01); *B66B 13/06* (2013.01)

(58) Field of Classification Search
CPC ......... B66B 13/06; B66B 13/08; B66B 13/14; B66B 13/16; B66B 13/20; E05B 47/00; E05B 15/0073; E05B 47/0038; E05B 47/004; E05B 2047/0074
See application file for complete search history.

(56) References Cited

U.S. PATENT DOCUMENTS 3,413,026 A * 11/1968 Kendrick .............. E05C 19/163 292/201
4,529,065 A * 7/1985 Kraft ....................... B66B 13/08 187/314
4,934,488 A * 6/1990 Umemura ............... B66B 13/16 187/335
5,174,417 A * 12/1992 Pilsbury .................. B66B 13/12 187/330
5,386,886 A * 2/1995 Kobayashi .............. B66B 13/16 187/335
5,823,026 A * 10/1998 Finke .................... E05B 47/023 70/279.1
5,894,911 A 4/1999 Bozorgzadeh et al.
7,823,699 B2 * 11/2010 Gieras ................... E05B 47/023 187/331

(Continued)

FOREIGN PATENT DOCUMENTS

EP 1361188 A1 11/2003
GB 601242 A * 4/1948

(Continued)

OTHER PUBLICATIONS

Machine translation of the Description of WO 2018037613 A1, Mar. 2018 (Year: 2018).*

(Continued)

*Primary Examiner* — Michael R Mansen
*Assistant Examiner* — Michelle M Lantrip
(74) *Attorney, Agent, or Firm* — Carlson, Gaskey & Olds, P.C.

(57) ABSTRACT

An illustrative example embodiment of an elevator door lock includes a latch that is moveable between a locking position and a released position. The latch includes a locking surface configured to engage a stop when the latch is in the locking position. A magnet is situated to magnetically attract a portion of the latch to selectively move the latch from the locking position into the released position.

13 Claims, 2 Drawing Sheets

(56) References Cited

U.S. PATENT DOCUMENTS

| | | | | |
|---|---|---|---|---|
| 8,136,299 | B2 * | 3/2012 | Inage | E05C 19/16 49/118 |
| 9,371,680 | B2 * | 6/2016 | Finke | E05F 15/643 |
| 9,695,015 | B1 * | 7/2017 | Marinelli | B66B 13/165 |
| 2010/0282546 | A1 * | 11/2010 | Han | B66B 13/125 187/319 |
| 2015/0239709 | A1 | 8/2015 | Kellenberger et al. | |

FOREIGN PATENT DOCUMENTS

| | | | | | |
|---|---|---|---|---|---|
| JP | H08165080 | A | * | 6/1996 | |
| JP | 2009067517 | A | | 4/2009 | |
| KR | 101741220 | B1 | * | 5/2017 | |
| WO | WO-2006041450 | A2 | * | 4/2006 | B66B 13/185 |
| WO | WO-2018037613 | A1 | * | 3/2018 | B66B 13/16 |

OTHER PUBLICATIONS

Extended European Search Report for Application No. EP 21 19 3650 dated Dec. 13, 2021.

* cited by examiner

MAGNETICALLY ACTIVATED ELEVATOR DOOR LOCK

BACKGROUND

Elevator systems are in widespread use for carrying passengers between various levels in buildings, for example. Access to an elevator car requires that elevator car doors open when the car is at a landing at which a passenger desires to board the elevator car, for example. Each landing includes hoistway doors that move with the elevator car doors between open and closed positions.

The elevator car doors and the hoistway doors have locks that prevent the doors from being improperly opened. The elevator car door lock typically includes a relatively expensive mechanism. For example, the elevator car door lock may include a solenoid to move the lock between a locked and unlocked condition. In addition to the component cost of typical mechanisms, door locks tend to increase the cost of maintaining an elevator system. It is believed that elevator door system components, such as the locks, account for approximately 50% of elevator maintenance requests and 30% of callbacks. One contributing factor to such issues is the way in which typical elevator car door locks are designed.

SUMMARY

An illustrative example embodiment of an elevator door lock includes a latch that is moveable between a locking position and a released position. The latch includes a locking surface configured to engage a stop when the latch is in the locking position. A magnet is situated to magnetically attract a portion of the latch to selectively move the latch from the locking position into the released position In an example embodiment having at least one feature of the elevator door lock of the previous paragraph, the locking surface is near a first end of the latch, the portion of the latch that is magnetically attracted by the magnet is near a second end of the latch, and the latch pivots about a pivot axis as the latch moves between the locking position and the released position.

In an example embodiment having at least one feature of the elevator door lock of any of the previous paragraphs, a mass of the latch is greater near the second end, gravity biases the second end in a downward direction to move the latch into the locking position, and the magnet attracts the portion against the bias of gravity to move the latch into the released position.

In an example embodiment having at least one feature of the elevator door lock of any of the previous paragraphs, the magnet is supported for movement relative to the latch between a first position and a second position, the latch is in the locking position when the magnet is in the first position, the magnet attracts the portion of the latch when the magnet is in the second position, and the latch is in the released position when the magnet is in the second position.

In an example embodiment having at least one feature of the elevator door lock of any of the previous paragraphs, the magnet moves in one direction between the first position and the second position, and the latch moves in a different direction between the locking position and the released position.

In an example embodiment having at least one feature of the elevator door lock of any of the previous paragraphs, the magnet moves in a horizontal direction between the first position and the second position, and the portion of the latch moves in a vertical direction.

In an example embodiment having at least one feature of the elevator door lock of any of the previous paragraphs, the magnet is a first distance from the portion of the latch when the magnet is in the first position, the magnet is a second distance from the portion of the latch when the magnet is in the second position, and the second distance is shorter than the first distance.

An illustrative example embodiment of an elevator door assembly includes the elevator door lock of any of the previous paragraphs, a door, and a door mover configured to move the door between open and closed positions. The magnet is associated with the door mover for movement between a first position and a second position. The magnet does not attract the portion of the latch when the magnet is in the first position. The latch is in the locking position when the magnet is in the first position. The magnet attracts the portion of the latch when the magnet is in the second position and the latch is in the released position when the magnet is in the second position.

In an example embodiment having at least one feature of the elevator door assembly of the previous paragraph, the stop is situated in a fixed position. The locking surface of the latch engages the stop when the latch is in the locking position. The door is prevented from movement out of the closed position when the locking surface engages the stop, and the magnet attracts the portion of the latch to move the locking surface away from the stop when the magnet is in the second position.

In an example embodiment having at least one feature of the elevator door assembly of any of the previous paragraphs, the magnet is supported on at least one guide and the magnet moves along the guide as the magnet moves between the first position and the second position.

In an example embodiment having at least one feature of the elevator door assembly of any of the previous paragraphs, the guide comprises at least one rail including a low friction material and the magnet slides along the low friction material.

In an example embodiment having at least one feature of the elevator door assembly of any of the previous paragraphs, the magnet moves in a horizontal direction between the first position and the second position, and the portion of the latch moves in a vertical direction as the latch moves between the locking position and the released position.

In an example embodiment having at least one feature of the elevator door assembly of any of the previous paragraphs, the latch is supported for pivotal movement relative to the stop between the locking position and the released position.

In an example embodiment having at least one feature of the elevator door assembly of any of the previous paragraphs, the locking surface is near a first end of the latch, the portion of the latch that is magnetically attracted by the magnet is near a second end of the latch, and a mass of the latch is greater near the second end. Gravity urges the second end in a downward direction to move the latch into the locking position when the magnet is in the first position, and the magnet attracts the portion against the bias of gravity to move the latch into the released position when the magnet is in the second position.

In an example embodiment having at least one feature of the elevator door assembly of any of the previous paragraphs, the latch is supported for movement with the door as the door moves between the open position and the closed position, the magnet moves with a corresponding portion of the door mover as the door moves between the open position and the closed position, and the portion of the latch remains attracted by the magnet during movement of the door between the open position and the closed position.

In an example embodiment having at least one feature of the elevator door assembly of any of the previous paragraphs, the magnet comprises a permanent magnet, and the portion of the latch comprises a ferromagnetic material.

The various features and advantages of at least one disclosed example embodiment will become apparent to those skilled in the art from the following detailed description. The drawings that accompany the detailed description can be briefly described as follows.

DETAILED DESCRIPTION

Figure 1:
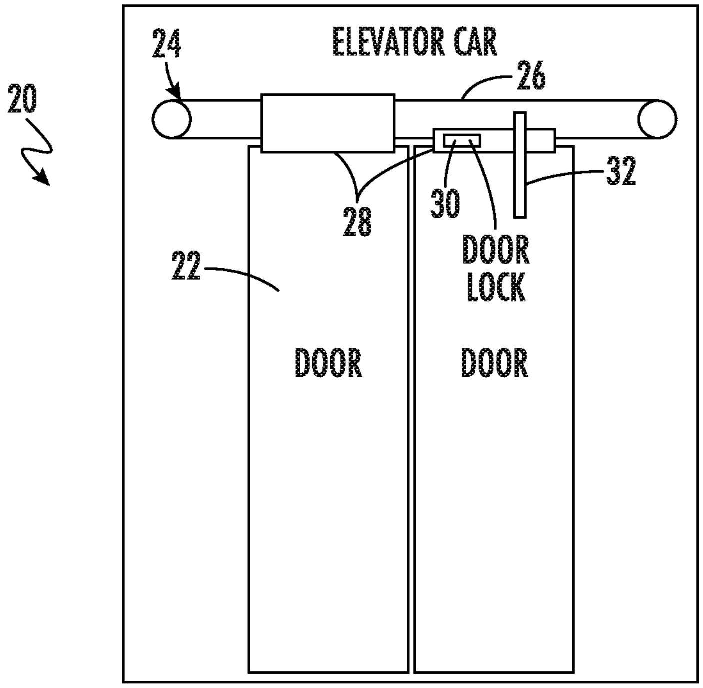
FIG. 1 schematically illustrates selected portions of an elevator car including an elevator door lock designed according to an example embodiment.

FIG. 1 schematically illustrates selected portions of an elevator car 20. Elevator car doors 22 are shown in a closed position. A door mover 24 selectively moves the doors 22 between the closed position and an open position under appropriate circumstances, such as when the elevator car 20 is at a landing and a passenger wants to board or exit the elevator car 20. The example door mover includes a belt 26 that is coupled to door hangers 28. As the belt 26 moves, the door hangers 28 and the doors 22 move.

At least one of the doors 22 includes a door lock 30 that prevents the doors 22 from being improperly opened. A vane 32 couples the elevator car doors 22 to hoistway doors (not illustrated) in a known manner so that the hoistway doors move together with the elevator car doors 22 when the door lock 30 is unlocked and the door mover 24 causes door movement.

Figure 2:
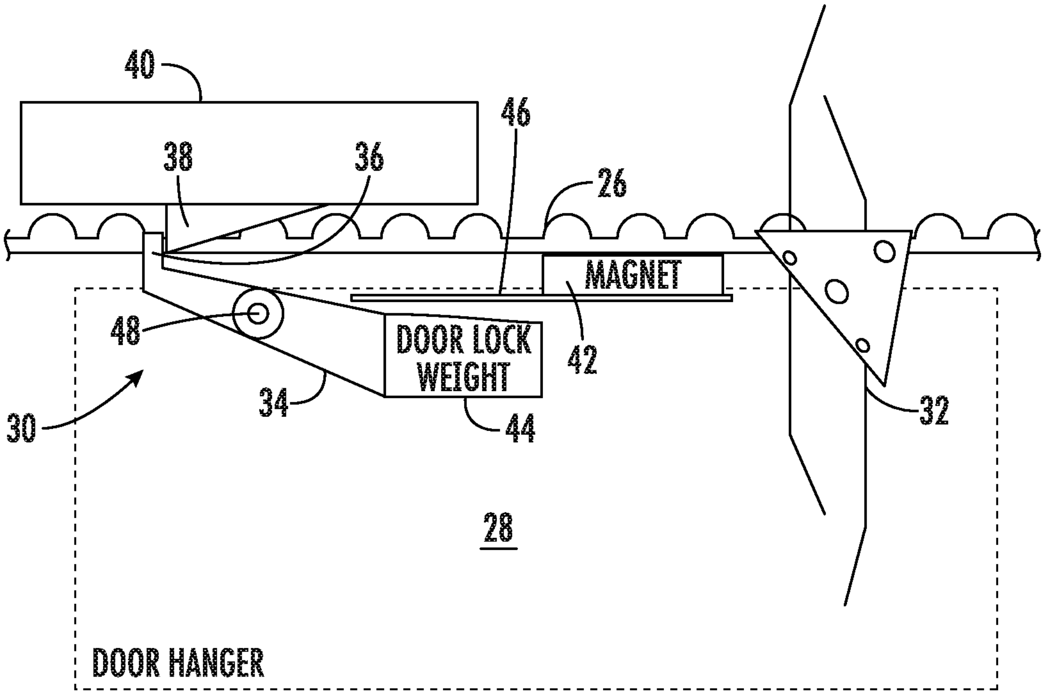
FIG. 2 schematically illustrates an example embodiment of the elevator door lock in a locked condition.
Figure 3:
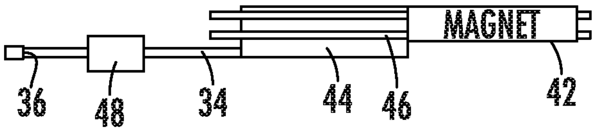
FIG. 3 is a top plan view showing selected portions of the elevator door lock in the locked condition shown in FIG. 2.

The door lock 30 is supported on the door hanger 28 of the corresponding door 22. As shown in FIGS. 2 and 3, the door lock 30 includes a latch 34 that has a locking surface 36. A stop 38 is situated in a fixed position. In the illustrated example, the stop 38 is supported on a door lintel 40 that remains stationary relative to the elevator car 20. The locking surface 36 engages the stop 38 when the latch 34 is in a locking position, which is shown in FIGS. 2 and 3. The engagement of the locking surface 36 and the stop 38 prevents the door on the right in FIG. 1 from being moved to the right (according to the drawings) from the illustrated closed position to an open position.

Figure 4:
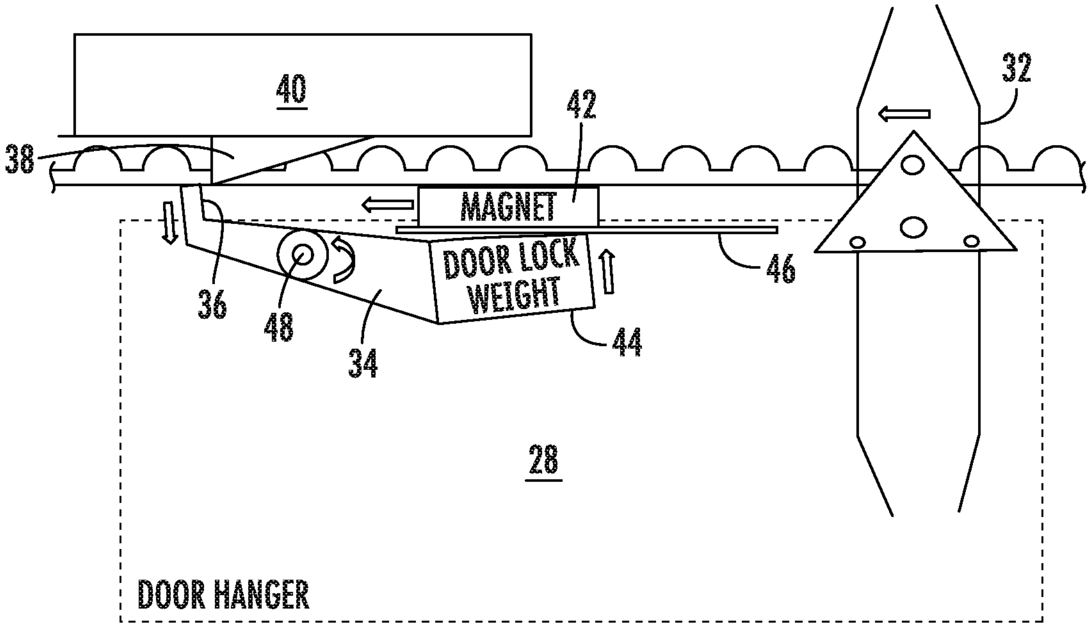
FIG. 4 schematically illustrates the elevator door lock of FIG. 2 in an unlocked condition.
Figure 5:
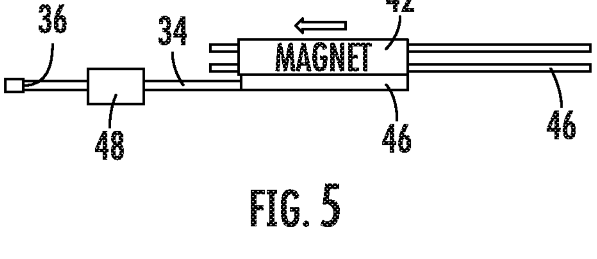
FIG. 5 is a top plan view showing selected portions of the elevator door lock in the unlocked condition shown in FIG. 4.

The door lock 30 includes a magnet 42 that interacts with a portion 44 of the latch 34 to selectively move the latch 34 from the locking position into a released position, which is shown in FIGS. 4 and 5. The magnet 42 in this example embodiment is a permanent magnet and the portion 44 of the latch 34 comprises a ferromagnetic material.

In the illustrated example embodiment, the magnet 42 is associated with the belt 26 of the door mover 24 so the magnet moves with the belt 26. The magnet 42 moves between a first position relative to the latch 34 as shown in FIGS. 2 and 3 and a second position as shown in FIGS. 4 and 5. In this embodiment, the magnet 42 is supported by a guide 46 that includes at least one rail. The magnet 42 slides along the guide 46 as the magnet 42 moves between the first and second positions. The guide 46 includes a low friction material on at least the surface that the magnet 42 slides along as the magnet 42 moves.

When the doors 22 are closed and the magnet 42 is in the first position shown in FIGS. 2 and 3, the latch 34 is in the locking position. In the illustrated example embodiment, the locking surface 36 is near a first end of the latch 34 and the portion 44 is near a second end. A mass of the first end of the latch 34 is less than a mass of the second end. In the illustrated example, the portion 44 includes a weight that establishes a greater mass near the second end of the latch 34. In other embodiments, the latch 34 is made with greater mass near the second end.

Gravity urges the latch 34 into the locking position because of the imbalance between the mass of the first and second ends of the latch 34. The latch 34 is supported on the door hanger 28 to pivot about a pivot axis 48 relative to the door hanger 28. The latch 34 pivots about the pivot axis 48 as it moves between the locking position (FIGS. 2 and 3) and the released position (FIGS. 4 and 5).

When the door mover 24 initiates opening the doors 22, the belt 26 moves (to the left according to the drawings) and the magnet 42 moves from the first position shown in FIGS. 2 and 3 toward a second position shown in FIGS. 4 and 5. As belt 26 moves, the magnet 42 slides along the guide 46 and approaches the portion 44. When the magnet 42 is close enough to the portion 44 for the magnetic field of the magnet 42 to attract the portion 44, the second end of the latch 34 pivots toward the magnet 42 (upward according to the drawings). Such movement caused by the magnetic attraction of the magnet 42 cause the locking surface 36 to pivot away from the stop 38 (downward according to the drawings). As the locking surface 36 moves away from the stop 38, the latch 34 moves from the locking position to the released position.

Movement of the belt 26, the position of the magnet 42 relative to the belt 26, and the position of the portion 44 relative to the door hanger are timed so that some initial movement of the belt 26 causes the latch 34 to move from the locking position shown in FIGS. 2 and 3 into the released position shown in FIGS. 4 and 5 before the door mover 24 urges the doors 22 out of the open position. In the first position, the magnet 42 does not overlap the portion 44 of the latch 34 and does not urge the latch 34 to pivot against the pull of gravity out of the locking position. The magnet 42 moves based on operation of the door mover 24 into sufficiently close proximity or overlap with the portion 44 where the magnetic attraction force of the magnet 42 draws the portion 44 toward the magnet 42 to move the latch 34 from the locking position into the released position.

The timing of moving the latch 34 into the released position is coordinated with expansion of the vane 32, which operates a hoistway door lock (not illustrated) to unlock the hoistway door at approximately the same time that the elevator car doors 22 are unlocked. The vane 32 is shown in FIG. 2 in a collapsed or contracted state and in an expanded state in FIG. 4. Those skilled in the art will recognize how such a vane can cooperate with a hoistway door coupler and lock mechanism to unlock the hoistway doors.

In the illustrated example embodiment, the magnet 42 remains in the overlapping, aligned position relative to the portion 44 shown in FIGS. 4 and 5 while the doors 22 are open. The door hanger 28 and door 22 move with the belt 26 in a manner that the magnet 42 remains in the second position where the magnet 42 retains the latch 34 in the released position.

As the doors 22 return to the closed position, the belt 26 and the magnet 42 move from the positions shown in FIGS. 4 and 5 into the positions shown in FIGS. 2 and 3. The magnet 42 moves far enough away from the portion 44 so that the magnetic pull of the magnet 42 no longer counteracts the pull of gravity and the latch 34 automatically or naturally pivots back into the locking position shown in FIG. 2. In that manner, the door lock 30 secures the doors 22 in a locked condition once the doors 22 are closed.

The guide 46 provides support beneath the mass of the magnet 42 to avoid strain on the belt 26. The guide 46 also facilitates expected and smooth movement of the magnet 42. Another feature of the guide 46 is that it facilitates decoupling the magnet 42 and the portion 44 because the guide 46 provide some spacing between the magnet 42 and the portion 44. Without any spacing, the magnet 42 and the portion 44 would directly contact each other, making separation less efficient.

In some embodiments, the guide 46 is made of a material that provides sound dampening to avoid an audible clicking noise as the magnet 42 draws the portion 44 toward the magnet 42 as the latch 34 pivots into the released position.

Elevator door locks like the illustrated example embodiment provide a robust and efficient door lock that is less prone to needing adjustment or repair over the service life of the elevator car 20. Elevator door locks consistent with this description can also be less expensive than other types of locks.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator door lock, comprising:
a latch that is moveable between a locking position and a released position, the latch including a locking surface configured to engage a stop when the latch is in the locking position, and wherein
the locking surface is near a first end of the latch, and
the latch pivots about a pivot axis as the latch moves between the locking position and the released position; and
a magnet that is situated to magnetically attract a portion of the latch to selectively move the latch from the locking position into the released position, wherein
the portion of the latch that is magnetically attracted by the magnet is near a second end of the latch,
a mass of the latch is greater near the second end,
gravity biases the second end in a downward direction to move the latch into the locking position,
the magnet attracts the portion against the bias of gravity to move the latch into the released position,
the magnet is supported for movement relative to the latch between a first position and a second position,
the latch is in the locking position when the magnet is in the first position,
the magnet attracts the portion of the latch when the magnet is in the second position, and
the latch is in the released position when the magnet is in the second position.

2. The elevator door lock of claim 1, wherein
the magnet moves in one direction between the first position and the second position, and
the latch moves in a different direction between the locking position and the released position.

3. The elevator door lock of claim 2, wherein
the magnet moves in a horizontal direction between the first position and the second position, and
the portion of the latch moves in a vertical direction.

4. The elevator door lock of claim 2, wherein
the magnet is a first distance from the portion of the latch when the magnet is in the first position,
the magnet is a second distance from the portion of the latch when the magnet is in the second position, and
the second distance is shorter than the first distance.

5. An elevator door assembly, comprising:
an elevator door lock comprising
a latch that is moveable between a locking position and a released position, the latch including a locking surface configured to engage a stop when the latch is in the locking position, and
a magnet that is situated to magnetically attract a portion of the latch to selectively move the latch from the locking position into the released position;
a door;
a door mover configured to move the door between open and closed positions; and
wherein the magnet is associated with the door mover for movement between a first position and a second position,
the magnet does not attract the portion of the latch when the magnet is in the first position,
the latch is in the locking position when the magnet is in the first position,
the magnet attracts the portion of the latch when the magnet is in the second position, and
the latch is in the released position when the magnet is in the second position.

6. The elevator door assembly of claim 5, comprising the stop situated in a fixed position and wherein
the locking surface of the latch engages the stop when the latch is in the locking position,
the door is prevented from movement out of the closed position when the locking surface engages the stop, and
the magnet attracts the portion of the latch to move the locking surface away from the stop when the magnet is in the second position.

7. The elevator door assembly of claim 5, wherein the magnet is supported on at least one guide and the magnet moves along the guide as the magnet moves between the first position and the second position.

8. The elevator door assembly of claim 7, wherein the guide comprises at least one rail including a low friction material and the magnet slides along the low friction material.

9. The elevator door assembly of claim 5, wherein
the magnet moves in a horizontal direction between the first position and the second position, and
the portion of the latch moves in a vertical direction as the latch moves between the locking position and the released position.

10. The elevator door assembly of claim 9, wherein the latch is supported for pivotal movement relative to the stop between the locking position and the released position.

11. The elevator door assembly of claim 10, wherein
the locking surface is near a first end of the latch,
the portion of the latch that is magnetically attracted by the magnet is near a second end of the latch,
a mass of the latch is greater near the second end,
gravity urges the second end in a downward direction to move the latch into the locking position when the magnet is in the first position, and
the magnet attracts the portion against the bias of gravity to move the latch into the released position when the magnet is in the second position.

12. The elevator door assembly of claim 5, wherein
the latch is supported for movement with the door as the door moves between the open position and the closed position,
the magnet moves with a corresponding portion of the door mover as the door moves between the open position and the closed position, and
the portion of the latch remains attracted by the magnet during movement of the door between the open position and the closed position.

13. The elevator door assembly of claim 5, wherein
the magnet comprises a permanent magnet, and
the portion of the latch comprises a ferromagnetic material.

* * * * *